(12) United States Patent
Tsai

(10) Patent No.: US 8,530,588 B2
(45) Date of Patent: Sep. 10, 2013

(54) LIQUID CRYSTAL (LC) ALIGNMENT AGENT, LC ALIGNMENT FILM AND LC DISPLAY DEVICE HAVING THEREOF

(75) Inventor: Tsung-Pei Tsai, Tainan (TW)

(73) Assignee: Chi Mei Corporation, Tainan (TW)

( * ) Notice: Subject to any disclaimer, the term of this patent is extended or adjusted under 35 U.S.C. 154(b) by 1313 days.

(21) Appl. No.: 13/329,334

(22) Filed: Dec. 19, 2011

(65) Prior Publication Data

US 2012/0172542 A1 Jul. 5, 2012

(30) Foreign Application Priority Data

Jan. 4, 2011 (TW) .............................. 100100211 A

(51) Int. Cl.
*C08L 77/10* (2006.01)
*C08L 79/08* (2006.01)
*C08L 63/00* (2006.01)

(52) U.S. Cl.
USPC ........................................ 525/423; 428/1.26

(58) Field of Classification Search
USPC ......................................................... 525/449
See application file for complete search history.

(56) References Cited

U.S. PATENT DOCUMENTS

| 5,225,104 A | * | 7/1993 | Van Steenkiste et al. ................ 252/299.01 |
| 5,969,055 A | | 10/1999 | Nishikawa et al. |
| 2003/0087045 A1 | | 5/2003 | Nakata et al. |

FOREIGN PATENT DOCUMENTS

| DD | 110399 | | 12/1974 |
| JP | 7-234410 A | | 9/1995 |
| JP | 10-219108 A | | 8/1998 |
| JP | 10-338880 A | | 12/1998 |
| JP | 2004-115813 A | | 4/2004 |
| JP | 2004-315690 A | | 11/2004 |
| JP | 2006023334 A | | 1/2006 |
| JP | 2009-175715 A | | 8/2009 |
| JP | 2009229935 A | * | 10/2009 |
| TW | 200606240 | | 2/2006 |

* cited by examiner

*Primary Examiner* — David Buttner
*Assistant Examiner* — Christopher M Rodd
(74) *Attorney, Agent, or Firm* — CKC & Partners Co., Ltd.

(57) ABSTRACT

A liquid crystal (LC) alignment agent is disclosed, which comprises polymer (A), tertiary hydramine (B) and epoxy group-containing compound (C). The LC alignment agent is added with a tertiary hydramine (B) and has an epoxy value of 0.065 to 0.900. The LC alignment agent can be employed to form a LC alignment film for enhancing the resulted LC alignment film with better rubbing resistance. A LC display (LCD) device that uses the LC alignment film has better voltage holding ratio (VHR) and process stability.

17 Claims, 1 Drawing Sheet

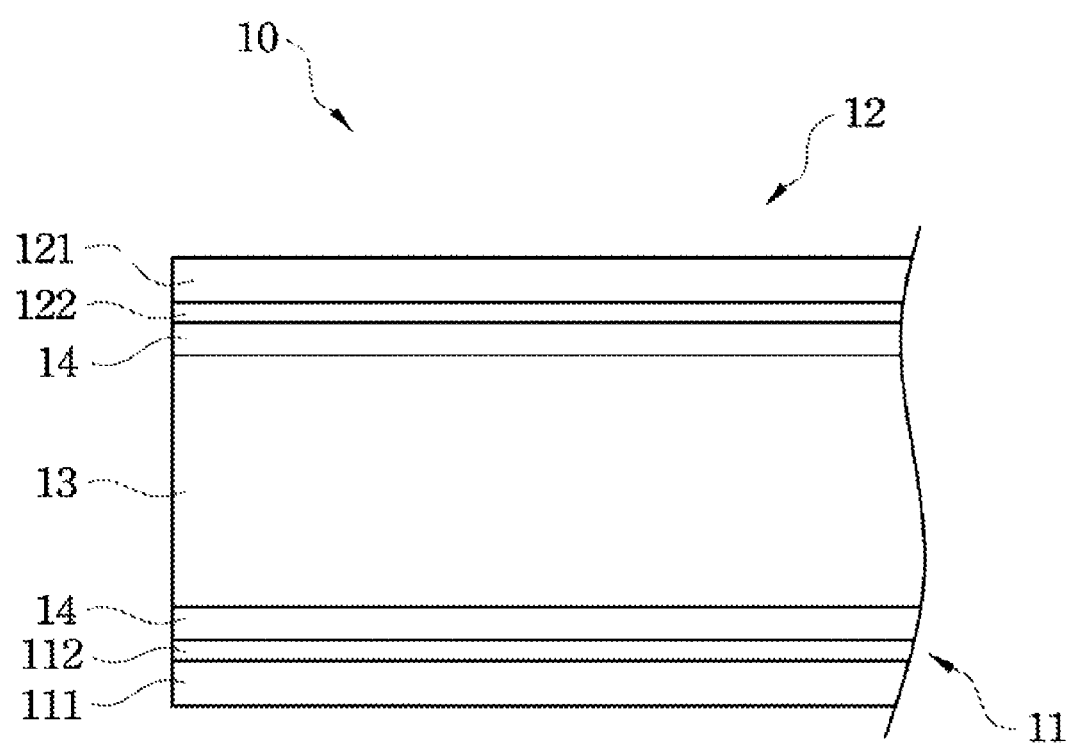

LIQUID CRYSTAL (LC) ALIGNMENT AGENT, LC ALIGNMENT FILM AND LC DISPLAY DEVICE HAVING THEREOF

RELATED APPLICATIONS

This application claims priority to Taiwan Application Serial Number 100100211, filed on Jan. 4, 2011, which is herein incorporated by to reference.

BACKGROUND

1. Field of Invention

The present invention relates to a liquid crystal (LC) alignment agent, a LC alignment film and a LC display (LCD) device having thereof. More particularly, the present invention relates to a LC alignment agent having better voltage holding ratio (VHR) and process stability, a LC alignment film and a LCD device having thereof.

2. Description of Related Art

At present, the polymers such as polyamide acid, polyimide, and the like, are used as a liquid crystal alignment agent, after coating onto a substrate having a transparent conducting film, heating and alignment process to form a liquid crystal alignment film for the liquid crystal display element. Finally, two of the substrates coated with alignment film are placed in opposite directions to form a LCD device holding a liquid crystal layer between the two substrates.

However, the liquid crystal alignment films of the prior art have inferior rubbing resistance, which results in poor pretilt angle stability. Hence, in order to improve the abrade phenomenon of alignment films, epoxy compounds are added to the alignment agent, such as Japanese Patent Publication No. 07-234410 and Japanese Patent Laid-Open No. 2006-23334. However, unreacted epoxy compounds easily remain in such LC alignment film after post-bake treatment, resulting in some shortcomings of worse voltage holding ratio (VHR) and process instability of the LCD device.

Accordingly, it is necessary to provide an LC alignment agent for improving shortcomings of worse voltage holding ratio (VHR) and process instability of the prior LCD device due to the residual of unreacted epoxy compounds after coating and post-bake treatments.

SUMMARY

A liquid crystal (LC) alignment agent is provided, which comprises a polymer (A), a tertiary hydramine (B) and an epoxy group-containing compound (C).

Moreover, a LC alignment film is provided, which is formed by using the aforementioned LC alignment agent.

Furthermore, a LC display (LCD) device is provided, which is characterized by including the aforementioned LC alignment film, thereby improving shortcomings of worse voltage holding ratio (VHR) and process instability of the prior LCD device.

Accordingly, the invention provides a LC alignment agent. The LC alignment agent comprises a polymer (A), a tertiary hydramine (B) and an epoxy group-containing compound (C), and the LC alignment agent has an epoxy value of 0.065 to 0.900.

The polymer (A) comprises polyamic acid (PAA) polymer (A-1) and/or polyimide (PI) (A-2) and/or PI block copolymer (A-3).

The tertiary hydramine (B) comprises a structure of Formula (III):

wherein $R^1$, $R^2$ and $R^3$ are aliphatic hydrocarbon groups or aromatic hydrocarbon groups both unsubstituted or substituted by an amine group, a hydroxyl group or an alkyl group, and at least one end of the $R^1$, $R^2$ and $R^3$ has a hydroxyl group.

Based on 100 parts by weight of the polymer (A), the LC alignment agent comprises 0.5 to 10 parts by weight of the tertiary hydramine (B) and 5 to 35 parts by weight of the epoxy group-containing compound (C).

Moreover, the invention provides a LC alignment film that is formed by using the aforementioned LC alignment agent.

In addition, the invention provides a LCD device that is characterized by including the aforementioned LC alignment film.

With application of the LC alignment agent of the present invention, the LC alignment film, the damage to the surface of the LC alignment film can be reduced which is caused by the rubbing process can be reduced, thereby effectively improving shortcomings of reduced VHR and process instability of the prior LCD device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a cross-sectional diagram of a LCD device according to the present invention.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Composition of LC Alignment Agent

Before proceeding further, it is appropriate to refer the LC alignment agent described herein that comprises a polymer (A), a tertiary hydramine (B) and an epoxy group-containing compound (C), and the LC alignment agent has an epoxy value of 0.065 to 0.900. Specifically, the LC alignment agent further comprises an organic solvent (D) and an additive.

If the LC alignment agent has no tertiary hydramine (B), the LCD device fabricated by such LC alignment agent will has shortcomings of worse VHR and process instability.

In addition, it should be mentioned that, if the LC alignment agent has the epoxy value of less than 0.065, the LCD device fabricated by such LC alignment agent will has trouble of worse VHR; and if the LC alignment agent has the epoxy value of more than 0.900, the LCD device fabricated by such LC alignment agent will has troubles of worse VHR and process instability.

Hereinafter, the polymer (A), the tertiary hydramine (B), the epoxy to group-containing compound (C), the organic solvent (D) and the additive will be described in more details.

Polymer (A)

The polymer (A) comprises polyamic acid (PAA) polymer (A-1) and/or polyimide (PI) (A-2) and/or PI block copolymer (A-3), in which the PI block copolymer (A-3) includes but is not limited to PAA-PAA block copolymer, PAA-PI block copolymer, PI-PI block copolymer or any combination thereof.

Among those polymers, the PAA polymer (A-1) is obtained by subjecting a diamine compound (a-1) and a tetracarboxylic diahydride compound (a-2) to a polycondensation. Based on one equivalent of the amine group of the diamine compound (a-1), the usage of the tetracarboxylic diahydride compound (a-2) is typically 0.2 to 2 equivalents, and preferably 0.3 to 1.2 equivalents.

Diamine Compound (a-1)

In an embodiment, the suitable diamine compound (a-1) is exemplified as an aliphatic diamine compound, an alicyclic diamine compound or an aromatic diamine compound. Those diamine compounds (a-1) may be used alone or in combinations of two or more.

The aliphatic diamine compound or alicyclic diamine compound are exemplified as 1,3-diaminopropane, 1,4-diaminobutane, 1,5-diaminopentane, 1,6-diaminohexane, 1,7-diaminoheptane, 1,8-diaminooctane, 1,9-diaminononane, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6.2.1.0$^{2.7}$]-undecylenedimethyldiamine, 4,4'-methylenebis(cyclohexylamine) and the like.

The aromatic diamine compound is exemplified as p-phenylenediamine, m-phenylenediamine, o-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenylether (a-1-6), 1,5-diaminonaphthalene, 2,2'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenylether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethane)biphenyl, 4,4'-bis[(4-amino-2-trifluoromethyl)phenoxy]-octafluorobiphenyl and the like.

Under the unaffected performance of the LC alignment film, the diamine compound (a-1) can be used in combination with other diamine compound such as 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridine lactate, 3,8-diamino-6-phenylphenanthridine, 1,4-diaminopiperazine, 3,6-diaminoacridine, bis(4-aminophenyl)phenylamine, and the compounds represented by the following Formula (I-1) to Formula (I-7) and Formula (I) to Formula (6). Those diamine compounds (a-1) may be used alone or in combinations of two or more.

The diamine compounds include the structures of Formula (I-1) and Formula (I-2) which contain two primary amines in a molecule and an additional nitrogen atom except from the two primary amines as follows:

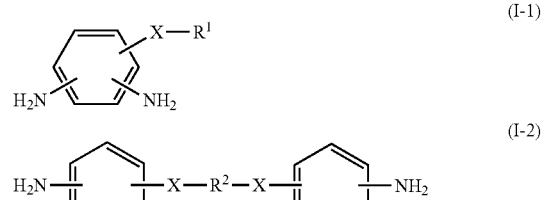

In Formula (I-1) and Formula (I-2), $R^1$ includes but is not limited to a monosubstituted group having a ring structure containing a nitrogen atom selected from the group consisting of pyridine, pyrimidine, triazine, piperidine and piperazine; X includes but is not limited to a disubstituted group; $R^2$ includes but is not limited to a disubstituted group having a ring structure containing a nitrogen atom selected from the group consisting of pyridine, pyrimidine, triazine, piperidine and piperazine; $X^2$ includes but is not limited to a divalent organic group; and a plurality of Xs of Formula (I-2) may be the same or different.

The diamine compounds further include the structures of Formula (I-3) to Formula (I-7) as follows:

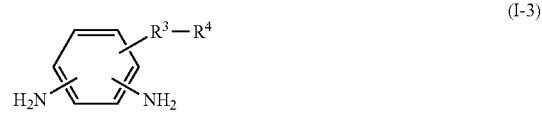

In Formula (I-3), $R^3$ includes but is not limited to a divalent organic group selected from the group consisting of an oxygen group (—O—), an ester group (—COO—, —OCO—), an amide group (—NHCO—, —CONH—) and a carbonyl group (—CO—); and $R^4$ includes but is not limited to a steroid skeleton, a trifluoromethyl group, a fluoro group or an alkyl group having 6 to 30 carbon atoms.

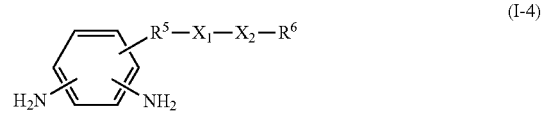

In Formula (I-4), $R^5$ is a divalent organic group selected from the group consisting of an oxygen group (—O—), an ester group (—COO—, —OCO—), an amide group (—NHCO—, —CONH—) and a carbonyl group (—CO—); $X_1$ and $X_2$ are having the structure selected from alicyclic, aromatic and heterocyclic ring skeleton; and $R^6$ is selected from the group consisting of an alkyl group having 3 to 18 carbon atoms, an alkoxy group having 3 to 18 carbon atoms, a fluoroalkyl group having 1 to 5 carbon atoms, a fluoroalkoxy group having 1 to 5 carbon atoms, a cyano group and halogen atoms.

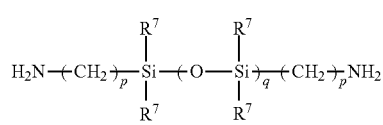
(I-5)

In Formula (I-5), $R^7$ is a hydrocarbon group having 1 to 12 carbon atoms, with the proviso that a plurality of $R^7$s may be the same or different; p is independently an integer of 1 to 3, and q is independently an integer of 1 to 20.

The diamine compounds of Formula (I-6) to Formula (I-7) are shown as follows:

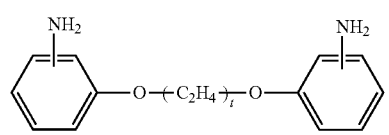
(I-6)

In Formula (I-6), t is an integer of 2 to 12.

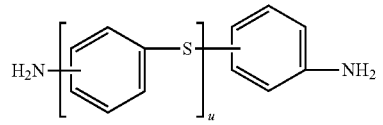
(I-7)

In Formula (I-7), u is an integer of 1 to 5.

The diamine compounds still further include the structures of Formula (I) to Formula (6) as follows, which may be used alone or in combinations of two or more:

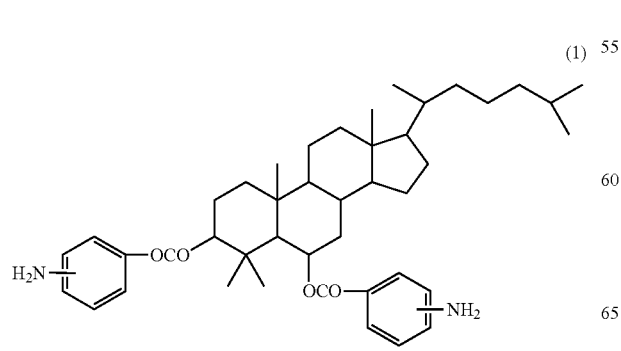
(1)

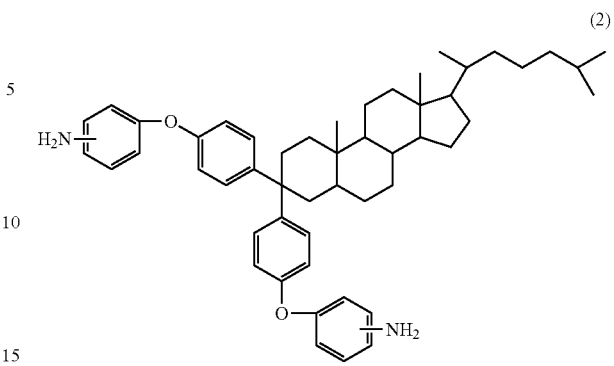

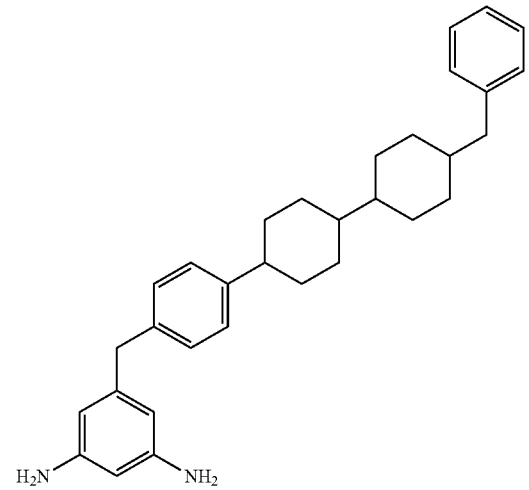

(6)

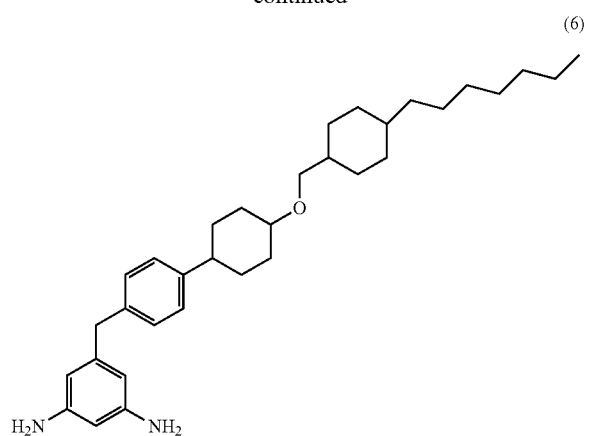

(9)

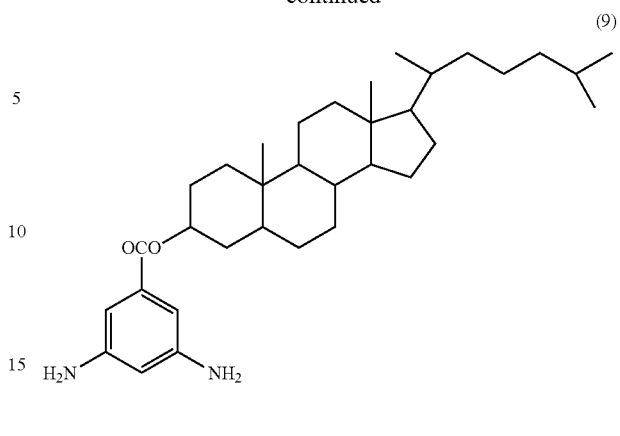

Among the aforementioned diamine compounds, p-phenylenediamine, 4,4'-diaminodiphenylmethane, 4,4'-diaminodiphenylsulfide, 1,5-diaminonaphthalene, 2,7-diaminofluorene, 4,4'-diaminodiphenylether, 2,2-bis[4-(4-aminophenoxy)phenyl]propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenyleneisopropylidene)bisaniline, 4,4'-(m-phenyleneisopropylidene)bisaniline, 1,4-diaminocyclohexane, 4,4'-methylenebis(cyclohexylamine), 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, the compounds represented by the above Formula (I) to Formula (6), the compound represented by the following Formula (7) in the above Formula (I-1), the compound represented by the is following Formula (8) in the above Formula (I-2), the compound represented by the following Formula (9) to Formula (17) in the above Formula (I-3), the compound represented by the following Formula (18) to Formula (20) in the above Formula (I-4), and the compounds represented by the following Formula (21) to Formula (34) are preferred.

(10)

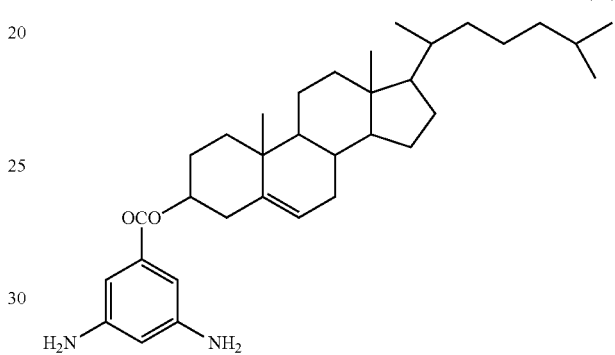

(11)

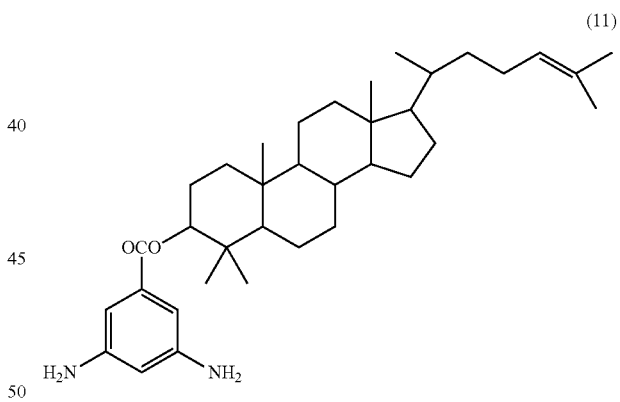

(7)

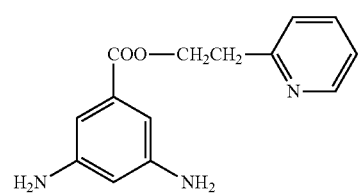

(8)

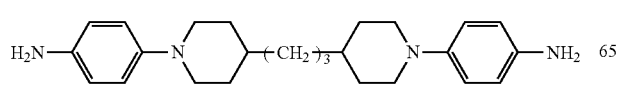

(12)

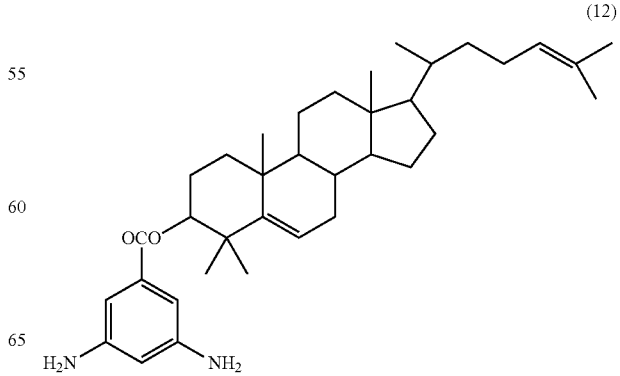

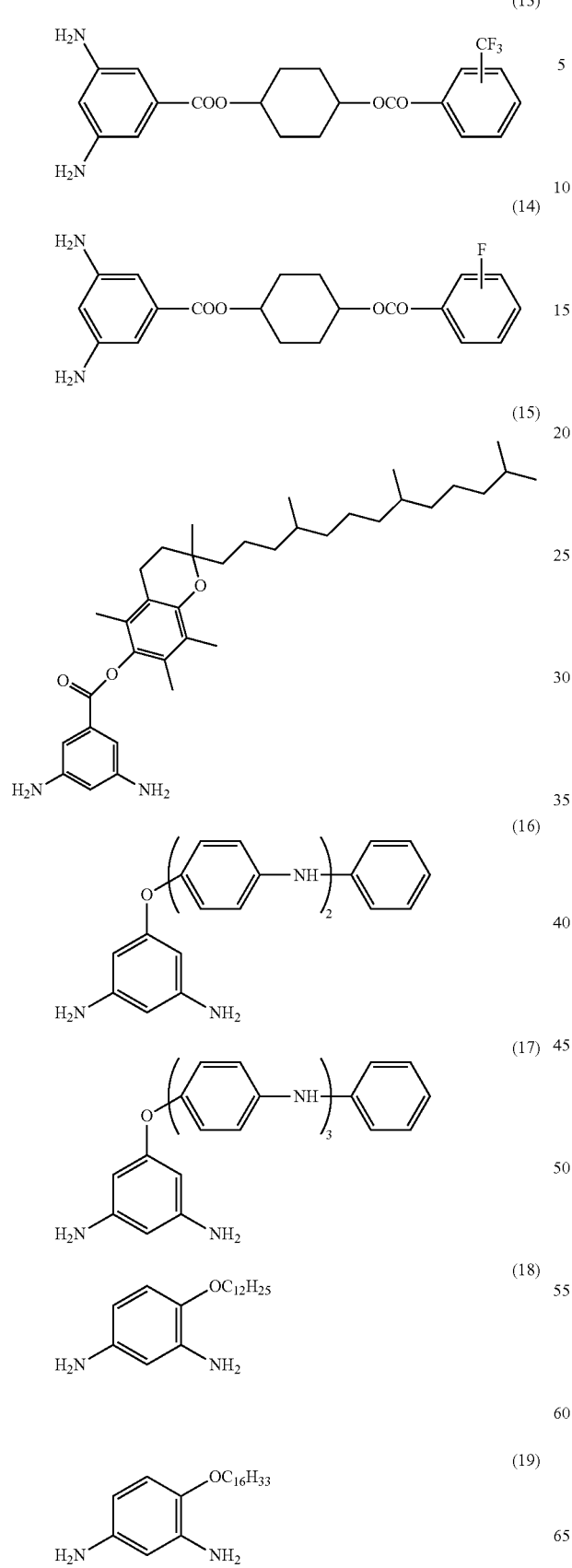
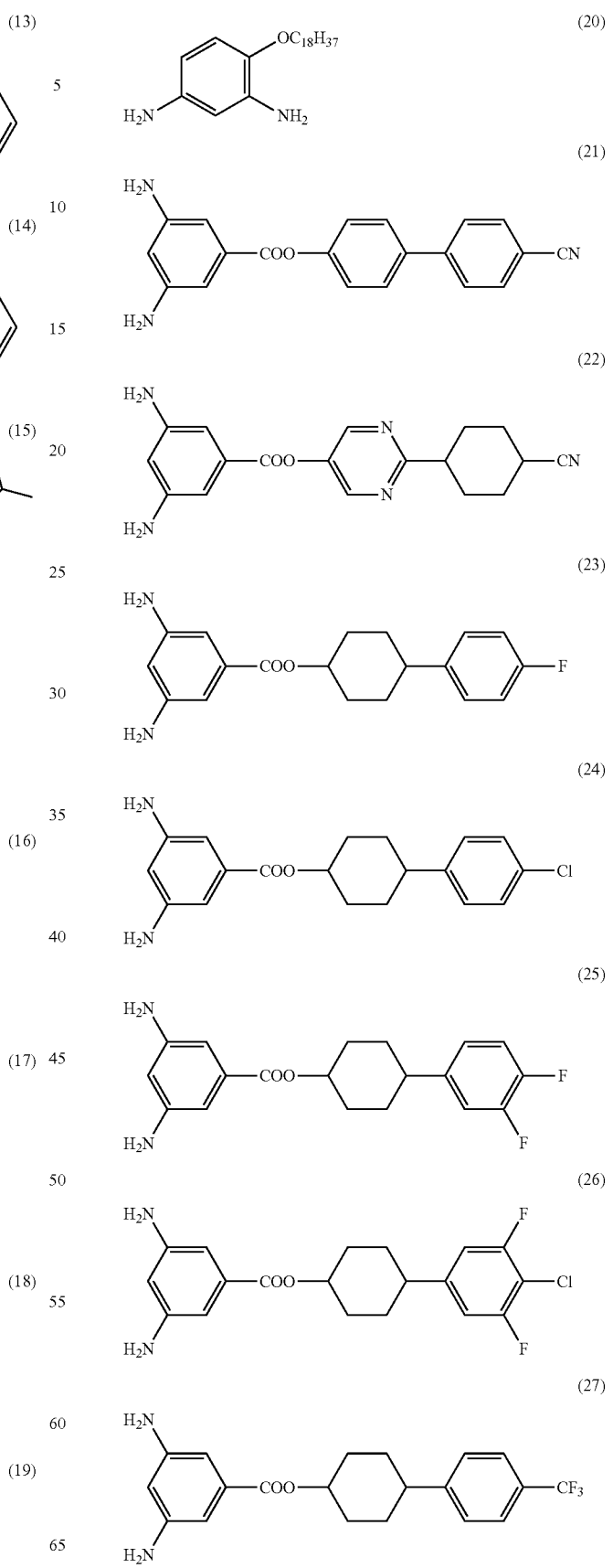

-continued

(28)
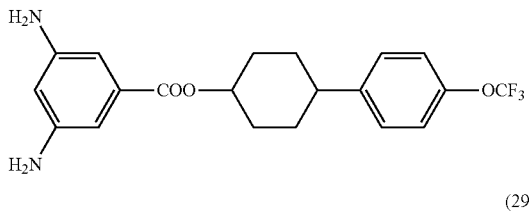

(29)
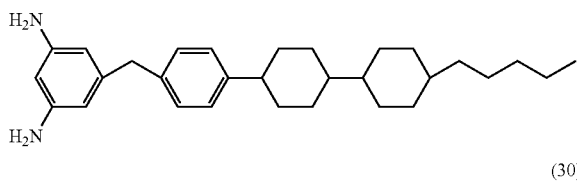

(30)
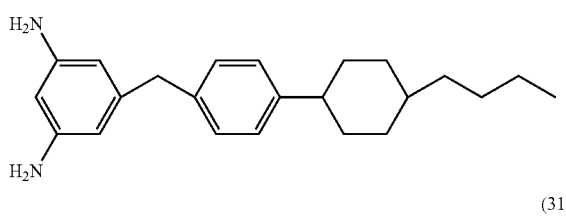

(31)
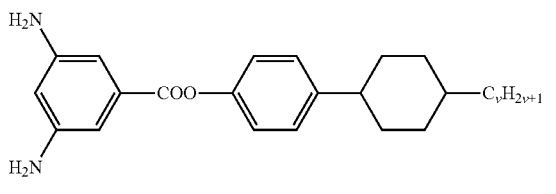

(32)
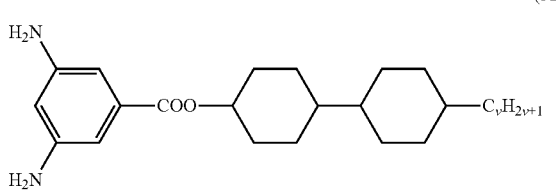

(33)
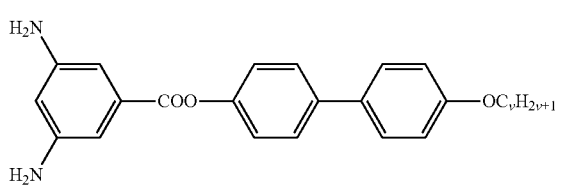

(34)
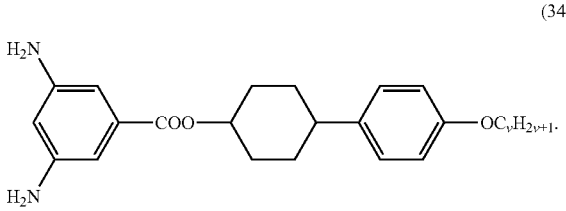

Tetracarboxylic Diahydride Compound (a-2)

The tetracarboxylic dianhydride compounds (a-2) are exemplified as aliphatic tetracarboxylic dianhydrides, alicyclic tetracarboxylic dianhydrides and aromatic tetracarboxylic dianhydrides, and those tetracarboxylic dianhydride compounds (a-2) may be used alone or in combinations of two or more.

Examples of the aliphatic tetracarboxylic dianhydrides include but are not limited to ethanetetracarboxylic dianhydride, butanetetracarboxylic dianhydride and the like.

Examples of the alicyclic tetracarboxylic dianhydrides include but are not is limited to 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexane-tetracarboxylic dianhydride, 3,3',4,4'-dicyclohexanetetracarboxylic dianhydride, 2,3,5-tricarboxycyclopentylacetic dianhydride, cis-3,7-dibutylcyclohepta-1,5-diene-1,2,5,6-tetracarboxylic dianhydride, 2,3,4,5-tetrahydrofuran tetracarboxylic dianhydride, 3,4-dicarboxy-1,2,3,4-tetrahydronaphthalene-1-succinic acid dianhydride (a-2-3), 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c-]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2.2.2]-octa-7-ene-2,3,5,6-tetracarboxylic dianhydride and compounds represented by the following Formula (II-1) and Formula (II-2):

(II-1)
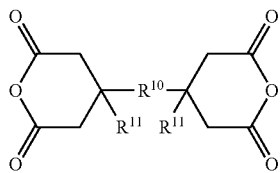

(II-2)
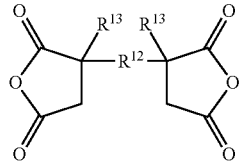

In Formula (II-1) and Formula (I-2), $R^{10}$ and $R^{12}$ are a disubstituted group having an aromatic ring; $R^{11}$ and $R^{13}$ are each a hydrogen atom or an alkyl group with the proviso that a plurality of $R^{11}$s and a plurality of $R^{13}$s may be the same or different.

Examples of the aromatic tetracarboxylic dianhydrides include but are not limited to pyromellitic dianhydride (a-2-1), 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4, 4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), and compounds represented by the following Formula (34) to Formula (37).

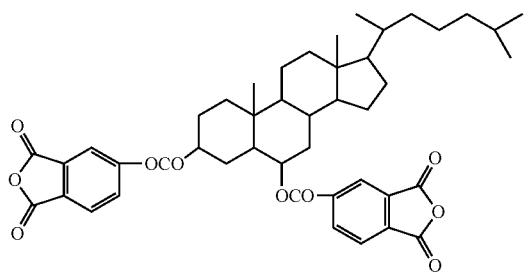

(34)

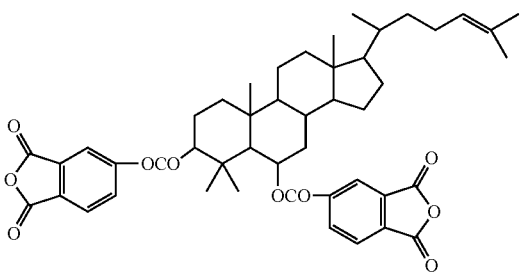

(35)

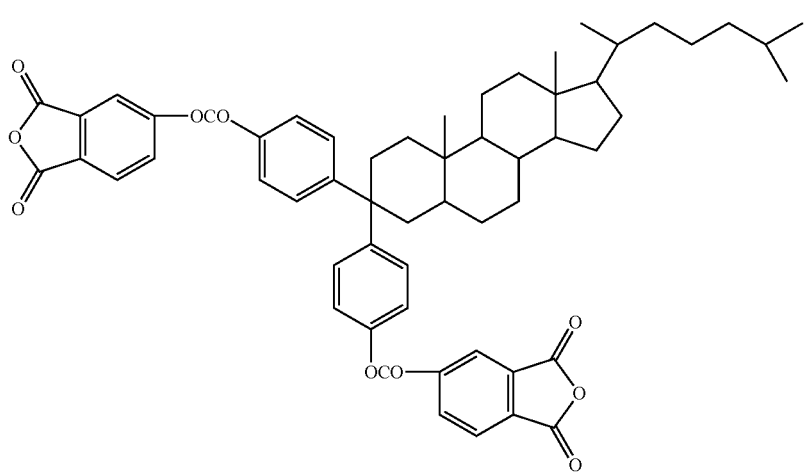

(36)

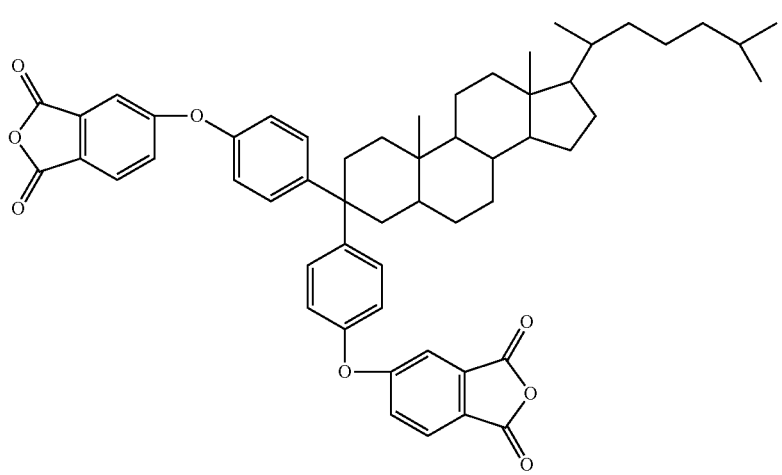

(37)

Among the aforementioned tetracarboxylic dianhydrides (a-2), 1,2,3,4-cyclobutanetetracarboxylic dianhydride (a-2-2), 1,2,3,4-cyclopentanetetracarboxylic dianhydride, 2,3,5-tricarboxycyclopentylacetic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride and 3,3',4,4'-biphenylsulfonetetracarboxylic dianhydride are preferred. The compound represented by the above Formula (II-1) includes but is not limited to the compounds represented by the following Formula (38) to Formula (40), and the compound represented by the above Formula (II-2) includes but is not limited to the compound represented by the following Formula (41).

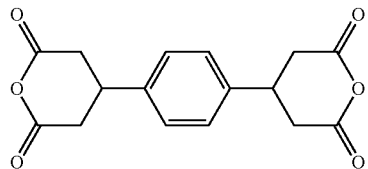
(38)

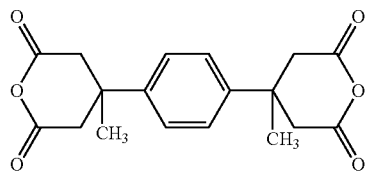
(39)

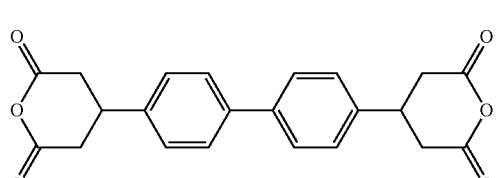
(40)

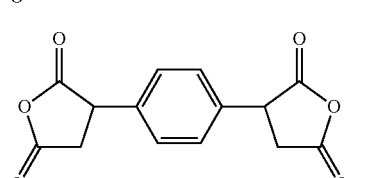
(41)

Method of Synthesizing Polymer (A)

The diamine compound (a-1) and the tetracarboxylic dianhydride compound (a-2) can be polymerized into the polymer (A) in the presence of an organic solvent (D) under suitable conditions. Hereinafter, polyamic acid (PAA) polymer (A-1) and/or polyimide (PI) (A-2) and/or PI block copolymer (A-3) will be described in more details.

Method of Synthesizing PAA Polymer (A-1)

The diamine compound (a-1) and the tetracarboxylic dianhydride compound (a-2) are dissolved in an organic solvent (D) and then subjected to the polycondensation reaction under the reaction temperature of 0° C. to 100° C. for one to 24 hours. The reaction solution is further poured into a large amount of a poor solvent to obtain a precipitate, and the resulted precipitate is dried under reduced pressure or under low pressure distillation using an evaporator, thereby obtaining a PAA polymer (A-1).

The organic solvent (D) is exemplified as an aprotic polar solvent or a phenolic solvent for dissolving the reactants and the products. Examples of the aprotic polar solvent include but are not limited to N-methyl-2-pyrrolidone (D-1), butyl cellosolve (D-2), N,N-dimethylacetamide (D-3), N,N-dimethylformamide, dimethylsulfoxide, γ-butyrolactone, tetramethylurea, hexamethylphosphor triamide and the like. Examples of the phenolic solvent include but are not limited to m-cresol, xylenol, phenol, halogenated phenols and the like.

During synthesizing the PAA polymer (A-1), the aforementioned organic solvent can be used in combination with a poor solvent such as alcohol, ketone, ester, ether, halogenated hydrocarbon, hydrocarbon, and the like in such an amount that does not cause precipitation of the formed polymer.

Examples of the poor solvent include methyl alcohol, ethyl alcohol, isopropyl alcohol, cyclohexanol, ethylene glycol, propylene glycol, 1,4-butanediol, triethylene glycol, acetone, methyl ethyl ketone, methyl isobutyl ketone, cyclohexanone, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene and the like.

Method of Synthesizing PI Polymer (A-2)

The aforementioned PM polymer (A-1) is dissolved in the organic solvent and heat in the presence of a dehydrator and an imidization catalyst to implement a dehydration/ring-closure reaction, so as to converting the amic acid group of PM polymer (A-1) into the imide group (imidization), thereby obtaining PI polymer (A-2).

The organic solvent used in the aforementioned imidization can be the same with the organic solvent (D) used in the polycondensation of the PM polymer (A-1) without reciting it in detail.

Moreover, examples of the aforementioned dehydrator include but are not limited to an acid anhydride compound such as acetic anhydride, propionic anhydride, trifluoroacetic anhydride and the like. The usage of the dehydrator is 0.01 mole to 20 moles based on one mole of the PM polymer (A-1).

Furthermore, the amount of the imidization catalyst includes but is not limited to a tertiary amine such as pyridine, collidine, lutidine, triethylamine and the like. The amount of the imidization catalyst used is 0.5 mole to 10 moles based on one mole of the dehydrator.

On one hand, if the dehydration/ring-closure reaction (imidization) is carried out below 40° C., the reaction would not proceed completely so that the imidization degree would be very low. On the other hand, if the dehydration/ring-closure reaction (imidization) is carried out above 200° C., the averaged molecular weight (MW) of the resultant PI polymer (A-2) would be low. Therefore, in order to keep the imidization degree in the aforementioned range, the heating temperature of the dehydration/ring-closure reaction (imidization) is controlled at 40° C. to 200° C., preferably at 80° C. to 150° C. Examples of the dehydrator used include an acid anhydride compound such as acetic anhydride, propionic anhydride, trifluoroacetic anhydride, and the like.

Method of Synthesizing PI Block Copolymer (A-3)

The aforementioned PAA polymer (A-1), PI polymer (A-2), the diamine compound (a-1) or the tetracarboxylic dianhydride compound (a-2) is dissolved in the organic solvent and then subjected to the polycondensation reaction under the reaction temperature of 0° C. to 200° C. or preferably at 0° C. to 100° C., so as to obtain the PI block copolymer (A-3). The organic solvent used in the aforementioned polycondensation reaction can be the same with the organic to solvent (D) used in the polycondensation of the PAA polymer (A-1) without reciting it in detail.

Specifically, the PI block copolymer (A-3) can be obtained by a further polycondensation reaction of the following reactants. For example: two PAA polymers (A-1) having different end groups and structures from each other; two PI polymers (A-2) having different end groups and structures from each other, or a PAA polymers (A-1) and a PI polymers (A-2) both having different end groups and structures from each other; a PAA polymer (A-1), a diamine compound and a tetracarboxylic dianhydride compound, and at least one of the diamine compound and the tetracarboxylic dianhydride compound used herein has different structures of the two compounds used in the PAA polymer (A-1); a PI polymer (A-2), a diamine compound and a tetracarboxylic dianhydride compound, and at least one of the diamine compound and the tetracarboxylic dianhydride compound used herein has different structures of the two compounds used in the PI polymer (A-2) during the polycondensation reaction; a PAA polymer (A-1), a PI polymer (A-2), a diamine compound and a tetracarboxylic dianhydride compound, and at least one of the diamine compound and the tetracarboxylic dianhydride compound used herein has different structures of the two compounds used in the PAA polymer (A-1) and the PI polymer (A-2) during the condensation reaction; two reactants having different structures that are selected from the group consisting of a PAA polymer (A-1), a diamine compound and a tetracarboxylic dianhydride compound; two reactants having different structures that are selected from the group consisting of a PI polymer (A-2), a diamine compound and a tetracarboxylic dianhydride compound; two PAA polymers (A-1) having end anhydride groups but different structures from each other, and a diamine compound; two PAA polymers (A-1) having end amine groups but different structures from each other, and a tetracarboxylic dianhydride compound; two PI polymers (A-2) having end anhydride groups but different structures from each other, and a diamine compound; two PI polymers (A-2) having end anhydride groups but different structures from each other, and a diamine compound; or two PI polymers (A-2) having end amine groups but different structures from each other, and a tetracarboxylic dianhydride compound.

Terminal Modified Polymer and Method of Synthesizing the Same

The terminal modified polymer can improve the coating performance of the LC alignment agent. For avoiding detracting the effect of the LC alignment agent, the polymer (A) can be optionally subjected to a molecular weight adjustment, so as to form a terminal modified polymer.

For example, the terminal modified polymer can be obtained by adding a monofunctional compound such as a monoanhydride, a monoamine compound, or monoisocyanate compound into the reaction system during the PAA polymer (A-1) is polycondensed.

Examples of the suitable monoanhydride include but are not limited to maleic anhydride, phthalic anhydride, itaconic anhydride, n-decyl succinic anhydride, n-dodecyl succinic anhydride, n-tetradecyl succinic anhydride, n-hexadecyl succinic anhydride and the like.

Examples of the suitable monoamine compound include but are not limited to aniline, cyclohexylamine, n-butylamine, n-pentyl amine, n-hexylamine, n-heptylamine, n-octylamine, n-nonylamine, n-decylamine, n-undecylamine, n-lauramine, n-tridecylamine, n-myristylamine, n-pentadecylamine, n-cetylamine, n-heptadecylamine, n-stearylamine, n-eicosylamine and the like.

Examples of the suitable monoisocyanate compound include but are not limited to phenyl isocyanate, naphthyl isocyanate and the like.

Tertiary Hydramine (B)

The tertiary hydramine (B) includes the structures of Formula (III) as follows:

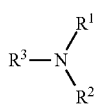

(III)

In Formula (III), $R^1$, $R^2$ and $R^3$ are aliphatic hydrocarbon groups or aromatic hydrocarbon groups both unsubstituted or substituted by an amine group, a hydroxy group or an alkyl group, and at least one end of the $R^1$, $R^2$ and $R^3$ has a hydroxy group.

The tertiary hydramine (B) of Formula (III) includes but is not limited to triethanolamine, dimethylaminoethanol, diethylpropanolamine, 2,4,6-tris(dimethylaminomethyl)phenol, 2,4,6-tris(diethylaminomethyl)phenol, 2,4,6-tris(diphenylaminomethyl)phenol, 2,4,6-tris(dibenzylaminomethyl)phenol, 2,4,6-tris(pyrrolidinomethyl)phenol, 2,4,6-tris(piperidinomethyl)phenol, 4-morpholinomethyl-2,6-bis(dimethylaminomethyl)phenol, 2,6-bis(dimethylaminomethyl)-4-[{methylamino(2'-hydroxyethyl)}methyl]phenol, 2,6-bis(dimethylaminomethyl)-4-[{methylamino(2'-hydroxypropyl)}methyl]phenol, 2,6-bis(dimethylaminomethyl)-4-(3'-hydroxypyrrolidinomethyl)phenol, 2,6-bis(dimethylaminomethyl)-4-(4'-hydroxypiperidinomethyl)phenol, 2,6-bis(dimethylaminomethyl)-4-[{bis(2'-hydroxyethyl)amino}methyl]phenol, 2,6-bis(dimethylaminomethyl)-4-[{bis(2'-hydroxypropyl)amino}methyl]phenol, 4-(dimethylaminomethyl)-2,6-bis(3'-hydroxypyrrolidinomethyl)phenol, 4-(dimethylaminomethyl)-2,6-bis(4'-hydroxypiperidinomethyl)phenol, 2,6-bis(pyrrolidinomethyl)-4-[{bis(2'-hydroxyethyl)amino}methyl]phenol, 2,6-bis(piperidinomethyl)-4-[{bis(2'-hydroxyethyl)amino}methyl]phenol, 4-dimethylaminomethyl-2,6-bis[{bis(2'-hydroxyethyl)amino}methyl]phenol, 4-dimethylaminomethyl-2,6-bis[{bis(2'-hydroxypropyl)amino}methyl]phenol, 4-[2-(dimethylamino)ethyl]phenol, 2,4,6-tris[{bis(2'-hydroxyethyl)amino}methyl]phenol, 2,4,6-tris[{bis(2'-hydroxypropyl)amino}methyl]phenol, 2,4,6-tris(3'-hydroxypyrrolidinomethyl)phenol, 2,4,6-tris(3'-hydroxymethyl pyrrolidinomethyl)phenol, 2,4,6-tris[(2'-hydroxyethyl)pyrrolidino methyl]phenol, 2,4,6-tris(4'-hydroxypiperidinomethyl)phenol, 2,4,6-tris(4'-hydroxymethylpiperidinomethyl)phenol, 2,4,6-tris[(2'-hydroxyethyl)piperidinomethyl]phenol, 2,4,6-tris[(2',3'-dihydroxypropyl)piperidinomethyl]phenol (or methyldiethanolamine), polyoxyethylene stearylamine, and polyoxyethylene lauryl amine.

Preferably, examples of the tertiary hydramine (B) include but are not limited to 2-dimethylaminoethanol (B-1), triethanolamine (B-2), 2,4,6-tri(dimethylaminomethyl)phenol (B-3), diethylpropanolamine (B-4), 4-[2-(dimethylamino)ethyl]phenol (B-5), 4-morpholinomethyl-2,6-bis(dimethyl aminomethyl)phenol, 2,6-bis(dimethylaminomethyl)-4-[{methylamino(2'-hydroxypropyl)}methyl]phenol, 2,4,6-tris[{bis(2'-hydroxypropyl)amino}methyl]phenol, methyldiethanolamine, 4-dimethylaminomethyl-2,6-bis[{bis(2'-hydroxypropyl)amino}methyl]phenol, 2,6-bis(dimethylaminomethyl)-4-(3'-hydroxypyrrolidinomethyl)phenol.

Based on 100 parts by weight of the polymer (A), the LC alignment agent comprises 0.5 to 10 parts by weight of the tertiary hydramine (B), preferably 0.8 to 9 parts by weight and more preferably 1 to 8 parts by weight.

Epoxy Group-Containing Compound (C)

The epoxy group-containing compound (C) includes but is not limited to dicyclopentadiene diepoxide, tricyclopentadiene diepoxide, tetracyclopentadiene diepoxide, pentacyclopentadiene diepoxide, ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexylene glycol diglycidyl ether, tripropylene glycol diglycidyl ether, 2,2-dibromo-neopentyl glycol diglycidyl ether, 1,3,5,6-tetraglycidyl-2,4-hexanediol, N,N,N',N'-tetraglycidyl-m-xylenediamine, 1,3-bis(N,N-diepoxy propyl aminomethyl)cyclohexane, N,N,N',N'-tetraglycidyl-4,4'-diaminodiphenylmethane, N,N-diglycidyl-p-glycidyloxyaniline, 3-(N-allyl-N-glycidy)aminopropyltrimethoxysilane, 3-(N,N-diglycidyl)aminopropyltrimethoxysilane and the like.

Preferably, examples of the epoxy group-containing compound (C) include but are not limited to dicyclopentadiene diepoxide (C-6), tricyclopentadiene diepoxide, ethylene glycol diglycidyl ether, diethylene glycol diglycidyl ether (C-2), polyethylene glycol diglycidyl ether, propylene glycol diglycidyl ether, tripropylene glycol diglycidyl ether (C-1), polypropylene glycol diglycidyl ether, N,N,N',N'-tetraglycidyl-m-xylenediamine, N,N,N',N'-tetraglycidyl-4,4'-diaminodiphenylmethane and the like. In this embodiment, examples of the epoxy group-containing compound (C) include but are not limited to N,N,N',N'-tetraglycidyl-4,4'-diaminodiphenylmethane (available commercially as MY721, Vantico, Inc., Brewster, N.Y.) (C-3), N,N-diglycidyl-p-glycidyloxyaniline (available commercially as JER630, Japan Epoxy Resin Co. Ltd.) (C-4), N,N,N',N'-tetraglycidyl-m-xylenediamine (available commercially as GA240, CVC Chemical, Morrestown, N.J.) (C-5).

Based on 100 parts by weight of the polymer (A), the LC alignment agent comprises 5 to 35 parts by weight of the epoxy group-containing compound (C), preferably 5 to 32 parts by weight and more preferably 5 to 30 parts by weight.

Organic Solvent (D)

The aforementioned polymer (A), the tertiary hydramine (B) and the epoxy group-containing compound (C) are dissolved in an organic solvent (D), for forming a LC alignment agent.

Examples of the organic solvent (D) include but are not limited to N-methyl-2-pyrrolidone (NMP; D-1), γ-butyrolactone (GBL), γ-butyrolactam, N,N-dimethylformamide (DMF; D-3), N,N-dimethylacetamide (DMAc), 4-hydroxy-4-methyl-2-pentanone, ethylene glycol monomethyl ether, butyl lactate, butyl acetate, methyl methoxy propionate, ethyl ethoxy propionate, ethylene glycol methyl ether, ethylene glycol ethyl ether, ethylene to glycol-n-propyl ether, ethylene glycol-isopropyl ether, butyl cellosolve (D-2), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate and the like.

Additive

In addition, the aforementioned LC alignment agent optionally includes an additive that includes but is not limited to a functional silane-containing compound.

Examples of the functional silane-containing compound include but are not limited to 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane and the like.

Based on 100 parts by weight of the polymer (A), the LC alignment agent comprises less than 40 parts by weight of the functional silane-containing compound, preferably 0.2 to 35 parts by weight and more preferably 0.5 to 30 parts by weight.

LC Alignment Agent

The LC alignment agent typically comprises the polymer (A), the tertiary hydramine (B) and the epoxy group-containing compound (C) dissolved in the organic solvent (D).

The LC alignment agent is prepared at 0° C. to 200° C. and preferably 20° C. to 60° C.

The LC alignment agent has an epoxy value of 0.065 to 0.900, preferably 0.100 to 0.850, and more preferably 0.150 to 0.800.

Method of Manufacturing LC Alignment Film

The resulted LC alignment agent is applied on an electrically-conductive transparent film of a substrate so as to form a coating layer. For achieving a better coating property, the solid content of the LC alignment agent can be freely adjusted according to the desired properties such as viscosity, volatility. For example, the solid content of the LC alignment agent is 1 weight percent to 15 weight percent, preferably 2 weight percent to 15 weight percent, and more preferably 3 weight percent to 15 weight percent.

After applying the LC alignment agent, the coating layer is subjected to a heating treatment that includes a pre-bake step and a post-bake step. In the pre-bake step, the organic solvent in the coating layer is evaporated and a LC alignment coating film is formed. In the post-bake step, the LC alignment coating film is further subjected to a dehydration/ring-closure reaction (imidization) so as to form the liquid crystal alignment film. The pre-bake step can be carried out at 30° C. to 200° C., preferably 40° C. to 110° C., and more preferably 50° C. to 100° C. The post-bake step can be carried out at 150° C. to 300° C., preferably 180° C. to 280° C., and more preferably 200° C. to 250° C. The heated LC alignment film has a thickness of 0.001 μm to 1 μm, and preferably 0.005 μm to 0.5 μm.

During the formation of the coating layer, the LC alignment agent is applied on the surface of the electrically-conductive transparent film by using the prior methods such as the roller coating method, the spin coating method, the printing method, the ink-jet method and the like, so that the LC alignment coating layer is formed. The LC alignment coating layer is then subjected to the heating treatment to form the LC alignment film on the surface of the electrically-conductive transparent film.

In addition, it should be mentioned that the LC alignment film can be further subjected to an aligning treatment, in which the LC alignment film is rubbed along a desired direction with a roller that is covered with nylon, rayon or cotton fiber, for providing the LC alignment film with alignment energy. Alternatively, MVA (Multi-domain Vertical Alignment) method or PVA (Patterned Vertical Alignment) method teaches that protrusions can be also formed on the surface of at least one substrate with the LC alignment film formed thereon, for providing the LC molecules with alignment energy and allowing the LC molecules being tilt at a given angle. However, those methods are widely known rather than focusing or mentioning them in details.

Method of Manufacturing LCD Device

Reference is made to FIG. 1, which is a cross-sectional diagram of a LCD device 10 according to the present invention. In FIG. 1, a first substrate 11 has a first side substrate 111 and a first electrically-conductive film 112 formed on a surface of the first side substrate 111. A second substrate 12 has a second side substrate 121 and a second electrically-conductive film 122 formed on a surface of the second side substrate 121.

The aforementioned first substrate 11 can be a thin-film transistor (TFT) side substrate, and the second substrate 12 can be a color filter (CF) side substrate.

The first side substrate 111 and the second side substrate 121 may be made of transparent materials. Suitable transparent materials include but are not limited to an alkali-free glass, Na—Ca glass, hard glass (Pyrex glass), a quartz glass, polyethylene terephthalate (PET), polybutylene terephthalate, polyethersulfone, polycarbonate and the like.

The first electrically-conductive film 112 and the second electrically-conductive film 122 can be a NESA® (a trademark owned by PPG Industries Ohio, Inc., U.S.A.) film made of tin oxide ($SnO_2$), a indium-tin-oxide (ITO) film made of indium oxide-tin oxide ($In_2O_3$—$SnO_2$) and the like.

A LC layer 13 can be interposed between the first substrate 11 and the second substrate 12, in which the LC layer 13 can be nematic LC materials with dielectric anisotropy, so that the LC layer 13 can be driven by an electric field generated by the first electrically-conductive film 112 and the second electrically-conductive film 122.

The nematic LC material include but is not limited to Shiff base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals and the like. Depending on actual requirements, the LC material may be optionally added with cholesteric liquid crystals (such as cholesteryl chloride, cholesteryl nonanoate, cholesteryl carbonate or the like) or chiral agents (such as the trade names of C-15 or CB-15 manufactured by Merck Ltd.).

The LC alignment films 14 are formed on the first substrate 11 and the second substrate 12 respectively and adjacent to the surface of the LC layer 13, so that the LC molecules of the LC layer 13 are tilt at a given angle. The method of manufacturing the LC alignment film is described as aforementioned without focusing or mentioning them in details.

During the assembly of the LCD device, the first substrate 11 and the second substrate 12 can be opposed to each other with a spacer (cell gap). Examples of the spacer are glass beads, plastic beads, photosensitive epoxy resin or the like.

Next, the peripheral portions of the first substrate 11 and the second substrate 12 are adhered together with a sealing agent but an LC injection hole is left. Later, a liquid crystal material is injected into the cell gap from the LC injection hole, and then the injection hole is sealed to form a LC cell. Then, a polarizer is affixed to the exterior sides of the first substrate 11 and the second substrate 12 which are the sides far from the LC cell, thereby assembling the LCD device. The polarizer may be a "H film" that is absorbed with iodine during the stretched and aligned treatment of polyvinyl alcohol, a polarizer sandwiched with cellulose acetate protection films, or a polarizer composed of the H film itself.

In addition, protrusions can be also formed on the surface of at least one substrate surface with the LC alignment film 14 formed thereon, for providing the LC molecules with alignment energy and allowing the LC molecules being tilt at a given angle, resulting in fabrication of MVA or PVA LCD devices. However, those methods are widely known rather than focusing or mentioning them in details.

Thereinafter, various applications of the present invention will be described in more details referring to several exemplary embodiments below, while not intended to be limiting. Thus, one skilled in the art can easily ascertain the essential characteristics of the present invention and, without departing from the spirit and scope thereof, can make various changes and modifications of the invention to adapt it to various usages and conditions.

Method of Synthesizing Polymer (A)

Synthesis Example 1

Method of Synthesizing Polymer (A-1-1)

A 500 mL four-necked conical flask equipped with a nitrogen inlet, a stirrer, a heater, a condenser and a thermometer was purged with nitrogen, and the components shown in Table 1 were charged to the flask. The aforementioned components comprising 1.69 g (0.003 mole) of the diamine compound of Formula (14) (a-1-1), 5.02 g (0.047 mole) of p-phenylenediamine (a-1-4) and 80 g of the organic solvent of N-methyl-2-pyrrolidone (NMP; D-1) were stirred at room temperature until dissolved completely. Next, 10.91 g (0.05 mole) of pyromellitic dianhydride (a-2-1) and 20 g of NMP were added and is left to react for 2 hours at room temperature for synthesizing a PAA polymer. After the reaction was completed, the PAA polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PAA polymer (A-1-1).

Synthesis Example 2

Method of Synthesizing Polymer (A-1-2)

A 500 mL four-necked conical flask equipped with a nitrogen inlet, a stirrer, a heater, a condenser and a thermometer was purged with nitrogen, and the components shown in Table 1 were charged to the flask. The aforementioned components comprising 4.23 g (0.0075 mole) of the diamine compound (a-1-1), 2.94 g (0.0275 mole) of p-phenylenediamine (a-1-4), 1.98 g (0.010 mole) of 4,4'-diaminodiphenylmethane (a-1-6) and 80 g of the organic solvent of NMP (D-1) were stirred at room temperature until dissolved completely. Next, 5.46 g (0.025 mole) of pyromellitic dianhydride (a-2-1), 4.91 g (0.025 mole) of 1,2,3,4-cyclobutanetetracarboxylic dianhydride (a-2-2) and 20 g of NMP were added and left to react for 2 hours at room temperature for synthesizing a PAA polymer. After the reaction was completed, the PAA polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PAA polymer (A-1-2).

Synthesis Example 3

Method of Synthesizing Polymer (A-1-3)

A 500 mL four-necked conical flask equipped with a nitrogen inlet, a stirrer, a heater, a condenser and a thermometer was purged with nitrogen, and the components shown in Table 1 were charged to the flask. The aforementioned components comprising 22.19 g (0.040 mole) of the diamine compound of Formula (5) (a-1-2), 1.98 g (0.010 mole) of 4,4'-diaminodiphenylmethane (a-1-5) and 80 g of the organic solvent of NMP (D-1) were stirred at room temperature until dissolved completely. Next, 9.81 g (0.05 mole) of 1,2,3,4-cyclobutanetetracarboxylic dianhydride (a-2-2) and 20 g of NMP were added and left to react for 2 hours at room temperature for synthesizing a PAA polymer. After the reaction was completed, the PAA polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PAA polymer (A-1-3).

Synthesis Example 4

Method of Synthesizing Polymer (A-2-1)

A 500 mL four-necked conical flask equipped with a nitrogen inlet, a stirrer, a heater, a condenser and a thermometer was purged with nitrogen, and the components shown in Table 1 were charged to the flask. The aforementioned components comprising 3.25 g (0.0075 mole) of the diamine compound of Formula (29) (a-1-3), 4.60 g (0.0425 mole) of p-phenylenediamine (a-1-4), and 68 g of the organic solvent of NMP (D-1) were heated and stirred at 60° C. until dissolved completely. Next, 15.01 g (0.05 mole) of 3,4-dicarboxy-1,2,3,4-tetrahydronaphthalene-1-succinic acid dianhydride (a-2-3) and 20 g of NMP were added and left to react for 6 hours at room temperature for synthesizing a PAA polymer. And then, 97 g of NMP, 5.61 g of acetic anhydride and 19.75 g of pyridine were added into the reaction solution, heated to 60° C. and stirred continually for 2 hours to carry out imidization. After the reaction was completed, the PI polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PI polymer (A-2-1).

Synthesis Example 5

Method of Synthesizing Polymer (A-2-2)

A 500 mL four-necked conical flask equipped with a nitrogen inlet, a stirrer, a heater, a condenser and a thermometer was purged with nitrogen, and the components shown in Table 1 were charged to the flask. The aforementioned components comprising 4.34 g (0.01 mole) of the diamine compound (a-1-3), 8.01 g (0.04 mole) of 4,4'-diaminodiphenylether (a-1-6), and 68 g of the organic solvent of NMP (D-1) were heated and stirred at 60° C. until dissolved completely. Next, 15.01 g (0.05 mole) of 3,4-dicarboxy-1,2,3,4-tetrahydronaphthalene-1-succinic acid dianhydride (a-2-3) and 30 g of NMP were added and left to react for 6 hours at room temperature for synthesizing a PAA polymer. And then, 97 g of NMP, 5.61 g of acetic anhydride and 19.75 g of pyridine were added into the reaction solution, heated to 60° C. and stirred continually for 2 hours to carry out imidization. After the reaction was completed, the PI polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PI polymer (A-2-2).

Synthesis Example 6

Method of Synthesizing Polymer (A-2-3)

A 500 mL four-necked conical flask equipped with a nitrogen inlet, a stirrer, a heater, a condenser and a thermometer was purged with nitrogen, and is the components shown in Table 1 were charged to the flask. The aforementioned components comprising 1.69 g (0.003 mole) of the diamine compound of Formula (14) (a-1-1), 9.31 g (0.047 mole) of 4,4'-diaminodiphenylmethane (a-1-5), and 100 g of the organic solvent of NMP (D-1) were heated and stirred at room temperature until dissolved completely. Next, 16.11 g (0.05 mole) of 1,2,3,4-cyclobutanetetracarboxylic dianhydride (a-2-2) and 205.42 g of NMP were added and left to react for 6 hours at room temperature. And then, 94.02 g of NMP, 5.15 g of acetic anhydride and 19.75 g of pyridine were added into the reaction solution, heated to 110° C. and stirred continually for 2 hours to carry out imidization. After the reaction was completed, the PI polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PI polymer (A-2-3).

Compositions of the polymer (A-1-1) of Synthesis Example 1 to the polymer (A-2-3) of Synthesis Example 6 were listed in Table 1.

TABLE 1

| | | Synthesis Examples | | | | | |
|---|---|---|---|---|---|---|---|
| Components | | 1 A-1-1 | 2 A-1-2 | 3 A-1-3 | 4 A-2-1 | 5 A-2-2 | 6 A-2-3 |
| Diamine compound (a-1) (mole %) | a-1-1 | 6 | 15 | | | | 6 |
| | a-1-2 | | | 80 | | | |
| | a-1-3 | | | | 15 | 20 | |
| | a-1-4 | 94 | 55 | | 85 | | |
| | a-1-5 | | 30 | 20 | | | 94 |
| | a-1-6 | | | | | 80 | |
| Tetracarboxylic dianhydride compound (a-2) (mole %) | a-2-1 | 100 | 50 | | | | |
| | a-2-2 | | 50 | 100 | | | 100 |
| | a-2-3 | | | | 100 | 100 | |

Compounds
a-1-1: Compound of Formula (14)
a-1-2: Compound of Formula (5)
a-1-3: Compound of Formula (29)
a-1-4: p-phenylenediamine
a-1-5: 4,4'-diaminodiphenylmethane
a-1-6: 4,4'-diaminodiphenylether
a-2-1: pyromellitic dianhydride
a-2-2: 1,2,3,4-cyclobutanetetracarboxylic dianhydride
a-2-3: 3,4-dicarboxy-1,2,3,4-tetrahydronaphthalene-1-succinic acid dianhydride Synthesis Example 7

Method of Synthesizing Polymer (A-3-1)

The polyimide polymer (A-1,1) and the polymer (A-2-3) were mixed in a ratio of 50:50 by volume and stirred at 60° C. until dissolved completely for synthesizing PAA-PI block copolymer. After the reaction was completed, the PI polymer solution was poured into 1500 mL of water for filtering the polymer. The filtered polymer was repeatedly washed using methanol and filtered thrice, and then placed into a vacuum oven, where dehydration was carried out at 60° C., thereby obtaining a PAA-PI block copolymer (A-3-1).

Method of Manufacturing LC Alignment Agent

The following examples are directed to the manufacturing process of the LC alignment agent of Examples 1 to 8 and Comparative Examples 1 to 6 according to TABLE 2.

Example 1

100 parts by weight of the polymer (A-1-1), 0.5 parts by weight of 2-dimethylaminoethanol (B-1) and 5 parts by weight of tripropylene glycol diglycidyl ether (C-1-1) were dissolved in a cosolvent of 1000 parts by weight of NMP (D-1)/800 parts by weight of butyl cellosolve (D-2) completely at room temperature, so as to form a LC alignment agent. And then, the epoxy value of the LC alignment agent was measured by using an epoxy value evaluation method that was described as follows.

Examples 2 to 8

Examples 2 to 8 were practiced with the same method as in Example 1 by using various kinds or usage of the polymer (A), the tertiary hydramine (B), the epoxy group-containing compound (C) and the organic solvent (D) listed in TABLE 2.

Comparative Examples 1 to 6

Comparative Examples 1 to 6 were practiced with the same method as in Example 1 by using various kinds or usage of the polymer (A), the tertiary hydramine (B), the epoxy group-containing compound (C) and the organic solvent (D) listed in TABLE 2.

Evaluation Method

Measurement of Epoxy Value

Prior to the formation of the LC alignment film from the LC alignment agent, the epoxy value of the LC alignment agent was measured by using the following steps:

1. 0.5 g to 0.6 of the LC alignment agent of the aforementioned Examples was weighed accurately and put into a 100-mL Erlenmeyer flask with a cap, and then the accurately weighed data S (unit: g) was recorded.

2. 20 mL of acetic acid/benzene (1/1 of volume ratio) was added for dissolving the LC alignment agent completely.

3. Three droplets of 1% phenolphthalein indicator were added.

4. Five droplets of crystal violet indicator were added.

5. The reaction solution was titrated with 0.1N hydrogen bromide (HBr)/acetic acid solution.

6. If the color changes of violet to blue-green color was observed and the blue-green color was kept for 30 seconds, the endpoint of titration would be reached. The titration volume V was recorded (unit: mL).

And then, the epoxy value (g of the epoxy group/100 g of the LC alignment agent) was calculated according to the following equation:

Epoxy value ($O$) of LC alignment agent=[($V-B$)×$F$×0.16]/$S$

Herein, S refers to the weight of the test sample of the LC alignment agent (g), V refers to the amount of the 0.1N HBr/acetic acid solution (mL) required for the test sample of the LC alignment agent, B refers to the amount of the 0.1N HBr/acetic acid solution (mL) required for a blank test, and F refers to the factor of the HBr/acetic acid solution.

Moreover, the factor standardization of the HBr/acetic acid solution was measured by using the following steps:

1. 0.1 g of sodium carbonate ($Na_2CO_3$) (dehydrated at 600° C. for one hour) was weighed accurately and put into a 100-mL Erlenmeyer flask with a cap, and then the accurately weighed data W (unit: g) was recorded.

2. 20 mL of acetic acid/benzene (1/1 of volume ratio) was added.

3. Ten droplets of crystal violet indicator were added.

4. The reaction solution was titrated with 0.1N hydrogen bromide (HBr)/acetic acid solution.

5. If the color changes of violet to blue-green color was observed and the blue-green color was kept for 30 seconds, the endpoint of titration would be reached. The titration volume A was recorded (unit: mL)

And then, the factor of the HBr/acetic acid solution was calculated according to the following equation:

factor=weight of $Na_2CO_3$($w$)/(0.0053×$A$)

Results of epoxy value measurement of the LC alignment agent of Examples were listed in TABLE 2. According to the results of TABLE 2, the LC alignment agents of Examples 1 to 8 had the epoxy values of 0.065 to 0.900 before the LC alignment agent of Examples were formed to the LC alignment films. However, the LC alignment agents of Comparative Examples 1 to 4 had the epoxy values of less than 0.065 or more than 0.900 even they included the tertiary hydramine (B). In addition, the LC alignment agents of Comparative Examples 5 to 6 had the epoxy values of 0.065 to 0.900, but they did not added with the tertiary hydramine (B).

Evaluation of Performance of LCD Device

Fabrication of LCD Device

The resulted LC alignment agents of Examples were coated onto two glass substrates provided with an ITO (indium-tin-oxide) film using a printing machine (manufactured by Nissha Printing, Model S15-036), after which pre-bake was carried out on a hot plate at a temperature of 100° C. for 5 minutes, and post-bake was carried out in an oven at a temperature of 220° C. for 30 minutes, so as to obtain LC alignment films. The thickness of the resulted LC alignment films was measured to approximately 800±200 Å using a film thickness measuring device (manufactured by KLA-Tencor, Model No. Alpha-step 500). And then, a surface of the thin film was subjected to an alignment (rubbing) process by using a rubbing machine (Model No. RMO2-11, manufactured by Iinuma Gauge Mfg. Co., Ltd.) provided with a roller wound with nylon cloth, a stage moving rate of 50 mm/sec, a hair push-in length of 0.3 mm, and rubbing one time along one direction, thereby obtaining the LC alignment film.

Following, two glass substrates having the LC alignment film were manufactured by the aforementioned steps. Thermo-compression adhesive agent was applied to one glass substrate, and spacers of 4 μm were sprayed on the other glass substrate. The glass substrates were aligned and bonded together in a vertically alignment direction, and then 10 kg of pressure was applied using a thermocompressor, and the thermocompression carried out at 150° C. Liquid crystal was injected into the cell gap using a liquid crystal pour machine (manufacture by Shimadzu Corporation, Model ALIS-100X-CH), and then ultraviolet light was used to harden a sealant for sealing the liquid inject hole, thereby manufacturing a liquid crystal cell. The liquid crystal was annealed in a oven at 60° C. for 30 minutes, so as to obtain the LCD device for further evaluating its performances such as voltage holding ratio (VHR) and process stability.

Evaluation of Voltage Holding Ratio

The voltage holding ratios (VHR) of the LCD devices were measured using an electrical measuring machine (manufactured by TOYO Corporation, Model 6254), which was applied with 4 volts voltage for 120 microseconds. The applied voltage was held for 16.67 milliseconds, after the applied voltage was cut off for 16.67 milliseconds, the VHR was measured, evaluated and represented as symbols according to the following standards:
◎: VHR≧98%
○: 98%>VHR≧96%
Δ: 96%>VHR≧94%
X: times.: VHR<94%

Evaluation of Process Stability

The resulted LC alignment agents of Examples were post-baked at various temperatures so as to obtain LC alignment films and LCD devices. The temperature of the post-baked treatment was exemplified as 200° C., 215° C. or 230° C. Later, the VHRs of the LCD devices were measured using the aforementioned method, and the process stability was evaluated according to the following equation:

VHR Variation=$VHR_{max}-VHR_{min}$

In the above equation, $VHR_{max}$ refers to the measured maximum of VHR of the LCD device after the post-baked treatment, and $VHR_{min}$ refers to the measured minimum of VHR of the LCD device after the post-baked treatment. The resulted VHR variation was evaluated and represented as symbols according to the following standards:
◎: VHR Variation≦2%
○: 2%<VHR Variation≦5%
Δ: 5%<VHR Variation≦10%
X: VHR Variation>10%

Evaluation results of VHR and VHR Variation of the LC alignment agent of Examples were also listed in TABLE 2.

According to the results of TABLE 2, the LCD devices had better VHR and process stability for achieving the purpose of the present invention when the LC alignment agents had the tertiary hydramine and the epoxy values of the LC alignment agents were controlled to 0.065 to 0.90.

Furthermore, it is necessarily supplemented that, specific compounds, specific compositions, specific reaction conditions, specific analyzing methods or specific instruments are employed as exemplary embodiments in the present invention, for evaluating the LC alignment agent, LC alignment film and LC display device having thereof in the present invention. However, as is understood by a person skilled in the art, the LC alignment agent, LC alignment film and LC display device having thereof in the present invention can include other compounds, other compositions, other reaction conditions, other analyzing methods or other instruments rather than limiting to the aforementioned examples.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 2

| Components | | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Polymer (A) (parts by weight) | A-1-1 | 100 | | | | | | | | 100 | | | | 100 | |
| | A-1-2 | | 100 | | | | | | 50 | | 100 | | | | |
| | A-1-3 | | | 100 | | | | | | | | | | | |
| | A-2-1 | | | | 100 | | | | | | | 100 | | | |
| | A-2-2 | | | | | 100 | | | 50 | | | | 100 | | |
| | A-2-3 | | | | | | 100 | | | | | | | 100 | |
| | A-3-1 | | | | | | | 100 | | | | | | | |
| Tertiary hydramine (B) (parts by weight) | B-1 | 0.5 | | | | | 5 | | | 0.5 | | | | | |
| | B-2 | | 2 | | | | | | 4 | | 2 | | | | |
| | B-3 | | | 4 | | | 5 | | | | | 4 | | | |
| | B-4 | | | | 6 | | | | 5 | | | | | | |
| | B-5 | | | | | 8 | | | | | | | 6 | | |
| Epoxy group-containing compound (C) (parts by weight) | C-1-1 | 5 | | | | | | | | 1 | | | | 10 | |
| | C-1-2 | | 10 | | | | | 5 | | | 2 | 30 | | | |
| | C-2-1 | | | 16 | | | | 10 | | | | | 40 | | 25 |
| | C-2-2 | | | | 20 | | | | | | | 30 | | | |
| | C-2-3 | | | | | 27 | | | 10 | | | | | | |
| | C-3-1 | | | | | | 35 | | 10 | | | | 40 | | |
| Organic solvent (D)* (parts by weight) | D-1 | 1000 | | 100 | 1500 | 1000 | 1000 | 1000 | | 1000 | 1000 | 1000 | 1000 | 1000 | 1000 |
| | D-2 | 800 | 1000 | | | | 800 | | 1800 | 800 | 800 | 800 | 800 | 800 | 800 |
| | D-3 | | 800 | 800 | | 500 | | 500 | | | | | | | |

TABLE 2-continued

| | | Examples | | | | | | | | Comparative Examples | | | | | |
|---|---|---|---|---|---|---|---|---|---|---|---|---|---|---|---|
| Components | | 1 | 2 | 3 | 4 | 5 | 6 | 7 | 8 | 1 | 2 | 3 | 4 | 5 | 6 |
| Epoxy value | | 0.012 | 0.035 | 0.051 | 0.069 | 0.089 | 0.118 | 0.045 | 0.062 | 0.004 | 0.008 | 0.149 | 0.186 | 0.024 | 0.076 |
| Evaluation Results | Voltage Holding Ratio | ◎ | ◎ | ◎ | ◎ | ◎ | ◎ | ○ | ○ | X | X | X | X | X | X |
| | Process stability | ◎ | ◎ | ◎ | ◎ | ◎ | ◎ | ○ | ○ | Δ | Δ | X | X | X | X |

Compounds

B-1: 2-Dimethylaminoethanol

B-2: Triethanolamine

B-3: 2,4,6-Tri(dimethylaminomethyl)phenol

B-4: Diethylpropanolamine

B-5: 4-(2-(Dimethylamino)ethyl)phenol

C-1-1: Tripropylene glycol diglycidyl ether

C-1-2: Diethylene glycol diglycidyl ether

C-2-1: MY721

C-2-2: JER630LSD

C-2-3: GA240

C-3-1: Dicyclopentadiene diepoxide

D-1: N-methyl-2-pyrrolidone (NMP)

D-2: Butyl cellosolve

D-3: N,N-dimethylacetamide

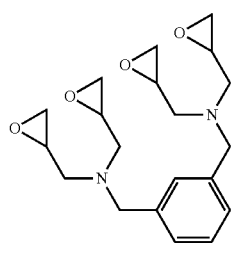

GA240

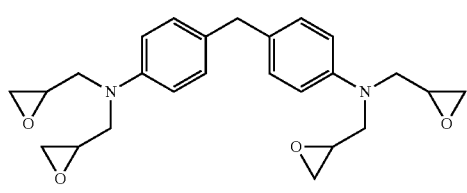

MY721

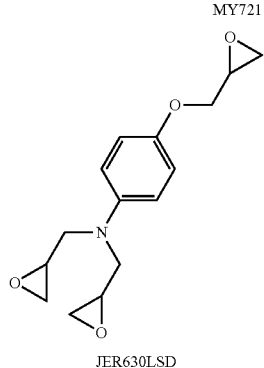

JER630LSD

What is claimed is:

1. A liquid crystal (LC) alignment agent, comprising:
a polymer (A), wherein the polymer (A) is obtained by reacting a diamine compound (a-1) with a tetracarboxylic dianhydride compound (a-2);
a tertiary hydroxylamine (B), wherein the tertiary hydroxylamine (B) comprises a structure of Formula (III):

(III)

wherein $R^1$, $R^2$ and $R^3$ are aliphatic hydrocarbon groups or aromatic hydrocarbon groups both unsubstituted or substituted by an amine group, a hydroxy group or an alkyl group, and at least one end of the $R^1$, $R^2$ and $R^3$ has a hydroxy group; and
an epoxy group-containing compound (C),
wherein the LC alignment agent has an epoxy value of 0.065 to 0.900.

2. The LC alignment agent of claim 1, wherein the polymer (A) comprises polyamic acid (PAA) polymer and/or polyimide (PI) and/or PI block copolymer.

3. The LC alignment agent of claim 1, wherein the LC alignment agent comprises 0.5 to 10 parts by weight of the tertiary hydroxylamine (B) and 5 to 35 parts by weight of the epoxy group-containing compound (C) based on 100 parts by weight of the polymer (A).

4. The LC alignment agent of claim 1, wherein the LC alignment agent has an epoxy value of 0.100 to 0.850.

5. The LC alignment agent of claim 1, wherein the LC alignment agent has an epoxy value of 0.150 to 0.800.

6. A LC alignment film formed by using the LC alignment agent according to claim 1.

7. The LC alignment film of claim 6, wherein the polymer (A) comprises polyamic acid (PAA) polymer and/or polyimide (PI) and/or PI block copolymer.

8. The LC alignment film of claim 6, wherein the tertiary hydroxylamine (B) comprises a structure of Formula (III):

(III)

wherein $R^1$, $R^2$ and $R^3$ are aliphatic hydrocarbon groups or aromatic hydrocarbon groups both unsubstituted or substituted by an amine group, a hydroxy group or an alkyl group, and at least one end of the $R^1$, $R^2$ and $R^3$ has a hydroxy group.

9. The LC alignment film of claim 6, wherein the LC alignment agent comprises 0.5 to 10 parts by weight of the tertiary hydroxylamine (B) and 5 to 35 parts by weight of the epoxy group-containing compound (C) based on 100 parts by weight of the polymer (A).

10. The LC alignment film of claim 6, wherein the LC alignment agent has an epoxy value of 0.100 to 0.850.

11. The LC alignment film of claim 6, wherein the LC alignment agent has an epoxy value of 0.150 to 0.800.

12. A LC display device, which is characterized by including the LC alignment film of claim 6.

13. The LC display device of claim 12, wherein the polymer (A) comprises polyamic acid (PAA) polymer and/or polyimide (PI) and/or PI block copolymer.

14. The LC display device of claim 12, wherein the tertiary hydroxylamine (B) comprises a structure of Formula (III):

(III)

wherein $R^1$, $R^2$ and $R^3$ are aliphatic hydrocarbon groups or aromatic hydrocarbon groups both unsubstituted or substituted by an amine group, a hydroxy group or an alkyl group, and at least one end of the $R^1$, $R^2$ and $R^3$ has a hydroxy group.

15. The LC display device of claim 12, wherein the LC alignment agent comprises 0.5 to 10 parts by weight of the tertiary hydroxylamine (B) and 5 to 35 parts by weight of the epoxy group-containing compound (C) based on 100 parts by weight of the polymer (A).

16. The LC display device of claim 12, wherein the LC alignment agent has an epoxy value of 0.100 to 0.850.

17. The LC display device of claim 12, wherein the LC alignment agent has an epoxy value of 0.150 to 0.800.

* * * * *